United States Patent [19]

Thompson

[11] Patent Number: 5,211,532
[45] Date of Patent: May 18, 1993

[54] APPARATUS FOR APPLYING A BACK PRESSURE TO A PUMP DRIVE SHAFT SEAL

[75] Inventor: Peter Thompson, Huddersfield, England

[73] Assignee: David Brown Engineering Limited, West Yorkshire, England

[21] Appl. No.: 892,702

[22] Filed: May 29, 1992

Related U.S. Application Data

[63] Continuation of Ser. No. 686,377, Apr. 17, 1991, abandoned.

[30] Foreign Application Priority Data

Apr. 21, 1990 [GB] United Kingdom ............... 9008987

[51] Int. Cl.$^5$ ............................................. F01D 11/00
[52] U.S. Cl. ..................... 415/113; 92/5 R; 277/2; 277/3; 277/27; 277/206 A
[58] Field of Search .................. 92/80, 82, 86, 5 R, 92/151; 277/2, 3, 27, 206 A; 138/31, 104; 417/423.11; 415/113

[56] References Cited

U.S. PATENT DOCUMENTS

| | | | |
|---|---|---|---|
| 3,176,996 | 4/1965 | Barnett | 277/3 |
| 3,418,001 | 12/1968 | Rewtschler et al. | 277/206 A |
| 3,471,156 | 10/1969 | Burns et al. | 277/3 |
| 3,544,116 | 12/1970 | Peterson | 277/3 |
| 3,907,001 | 9/1975 | Vanderlaan et al. | 138/31 |
| 4,206,928 | 6/1980 | Asawo | 277/3 |
| 4,460,181 | 7/1984 | Araoka | 277/2 |
| 4,621,981 | 11/1986 | Lorett | 417/423.11 |
| 4,793,241 | 12/1988 | Mano et al. | 92/5 R |
| 4,858,937 | 8/1989 | Fairue-Clarke et al. | 277/27 |
| 5,024,250 | 6/1991 | Nakamura | 92/5 R |

FOREIGN PATENT DOCUMENTS

| | | |
|---|---|---|
| 3347263 | 7/1985 | Fed. Rep. of Germany . |
| 8814480 | 4/1989 | Fed. Rep. of Germany . |
| 0065922 | 1/1982 | France . |
| 0846796 | 7/1981 | U.S.S.R. ............... 138/31 |

Primary Examiner—Thomas E. Denion
Attorney, Agent, or Firm—Nixon & Vanderhye

[57] ABSTRACT

An arrangement for applying a back pressure to a shaft seal of a mechanism such as a pump comprises a piston slidable in a cylinder one end of which communicates with the fluid being pumped and the other end of which contains oil communicating with a sealed chamber on that side of the seal remote from the fluid. Hitherto, the piston has created a preponderance of the back pressure over the pressure of the fluid by virtue of its weight. This preponderance has been very small, and the rolling diaphragm seal needed on the piston has been easily ruptured if the oil has been lost, thereby allowing possibly hazardous fluids to escape. A greater preponderance of the back pressure, allowing the use of a stronger type of piston seal, is provided by urging the piston towards the other end of the cylinder by a spring as well as by the pressure of the fluid. A magnet on the piston remotely actuates a series of flaps hinged along the exterior of the cylinder to give a visual indication of the position of the piston and also effects automatic replenishing of the oil if necessary or operates a remote warning signal when replenishing is needed.

8 Claims, 4 Drawing Sheets

APPARATUS FOR APPLYING A BACK PRESSURE TO A PUMP DRIVE SHAFT SEAL

This is a continuation of application Ser. No. 07/686,377, filed Apr. 17, 1991, now abandoned.

This invention relates to means for applying a back pressure to a shaft seal, particularly but not exclusively for the drive shaft of process pumps which are frequently required to pump hazardous fluids. The word "fluids" is herein intended to denote liquids, gases, or mixtures of the two.

DESCRIPTION OF THE PRIOR ART

Hitherto, a back pressure has been applied to oil in a sealed chamber on that side of the shaft seal remote from the fluid being pumped by two kinds of means. One kind comprises an auxiliary pump and associated control valve means, and has the disadvantage of being very expensive relative to the cost of the process pump. The other known kind of means comprises a heavy piston slidable in a vertical cylinder the upper end of which communicates with the fluid being pumped and the lower end of which communicates with the aforesaid sealed chamber, the piston being urged towards the lower end of the cylinder by the pressure of the fluid being pumped and additionally by its own weight, and being provided with sealing means of rolling diaphragm type which are virtually frictionless. Said other kind of means is considerably cheaper than said one kind, but has the disadvantages that the preponderance of the back pressure over the pressure of the fluid being pumped caused by the weight of the piston is very small, say one pound per square inch (approximately 0.07 kilogrammes per square centimeter), and that the rolling diaphragm seal is easily ruptured if the oil is lost, thereby allowing possibly hazardous fluids to escape to atmosphere.

OBJECT OF THE INVENTION

The object of the present invention is to provide means which are relatively cheap, which apply a greater preponderance of back pressure, and which practically obviate the possibility of escape of the fluid being pumped.

SUMMARY OF THE INVENTION

According to the invention, means for applying a back pressure to a shaft seal of a pump or the like comprise a piston slidable in a cylinder one end of which communicates with the fluid being pumped and the other end of which contains oil communicating with a sealed chamber on that side of the shaft seal remote from said fluid, said piston being urged towards said other end of the cylinder by spring means as well as by the pressure of the fluid being pumped and being provided with sealing means which slide in frictional contact with the cylinder.

BRIEF DESCRIPTION OF THE DRAWINGS

A preferred embodiment of the invention will now be described, by way of example only, with reference to the accompanying drawings of which.

DESCRIPTION OF THE PREFERRED EMBODIMENT

Figure 1:
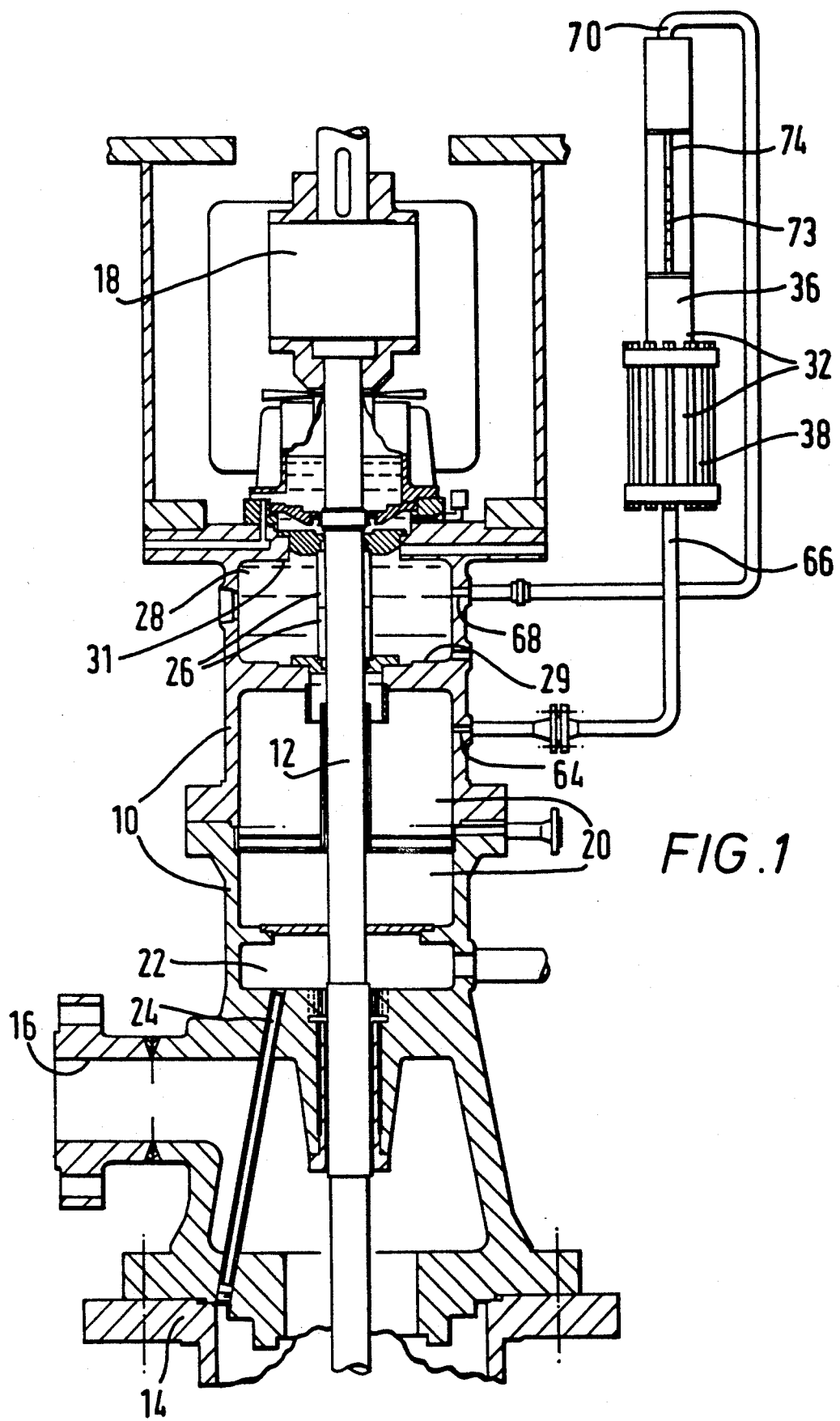
FIG. 1 is a sectional side elevation of headgear for a process pump provided with means for applying a back pressure to a shaft seal thereof.

Referring now to the drawings, a centrifugal process pump of well known type has a headgear as shown in FIG. 1 which comprises a main casing including a casing 10 and a second casing 14 in which there is rotatably mounted a drive shaft 12. The casing 10 is bolted to a generally cylindrical second casing 14 through which the shaft 12 extends axially and within which there is disposed at least one impeller (not shown) secured on the shaft 12. Usually a plurality of impellers acting in series is provided. The pump has an inlet (not shown) in the casing 14 and an outlet 16 in the casing 10. The shaft 12 projects from that end of the casing 10 remote from the second casing 14 for connection to an electric motor 18. Interconnected spaces 20, 22 in the casing 10 communicate with the inlet of the pump by way inter alia of a conduit 24.

Figure 2:
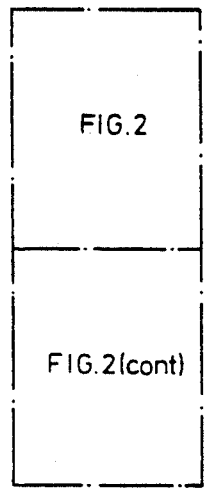
FIG. 2 is a sectional side elevation of said means on a larger scale.
Figure 2:
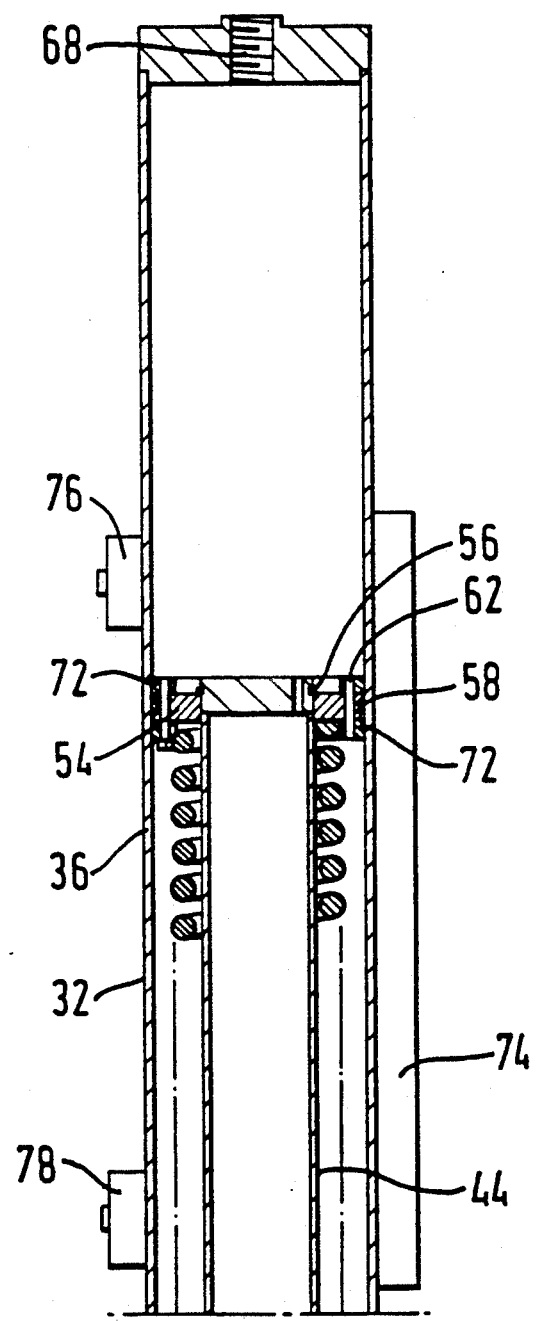
Figure 2:
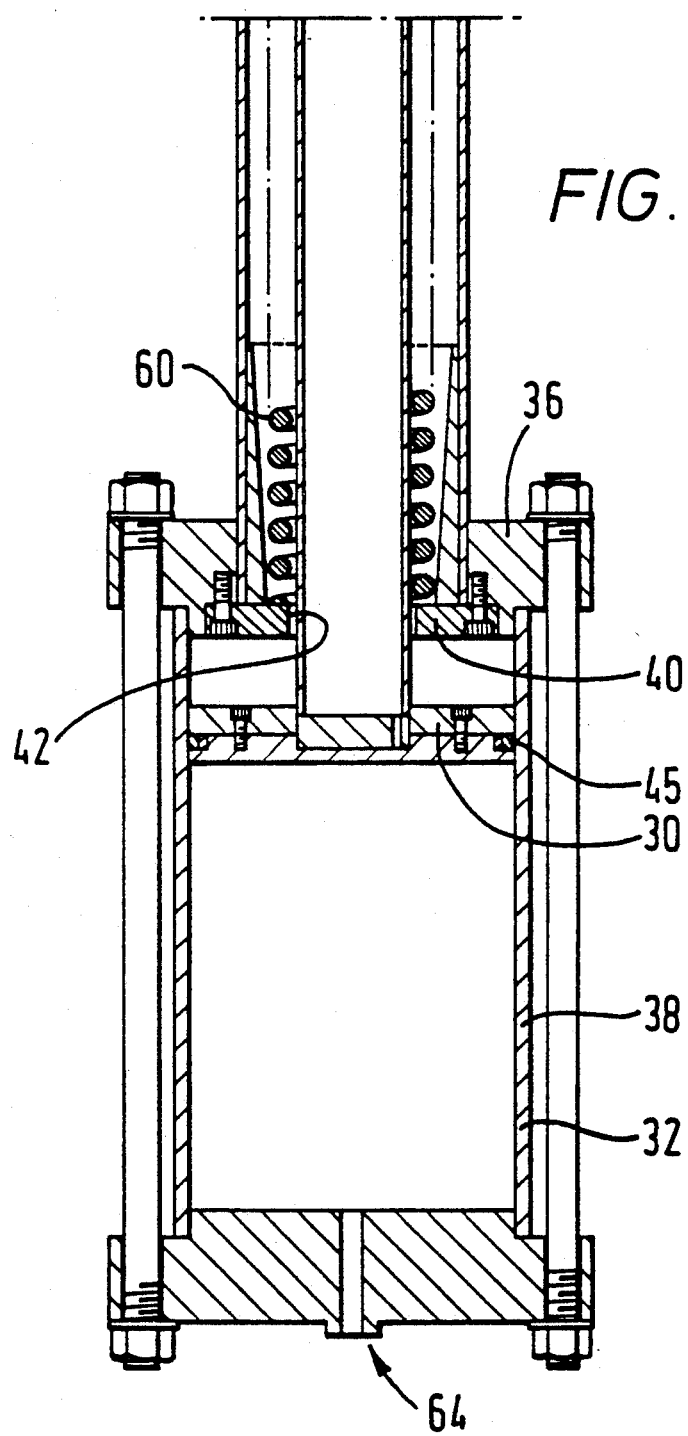
Figure 3:
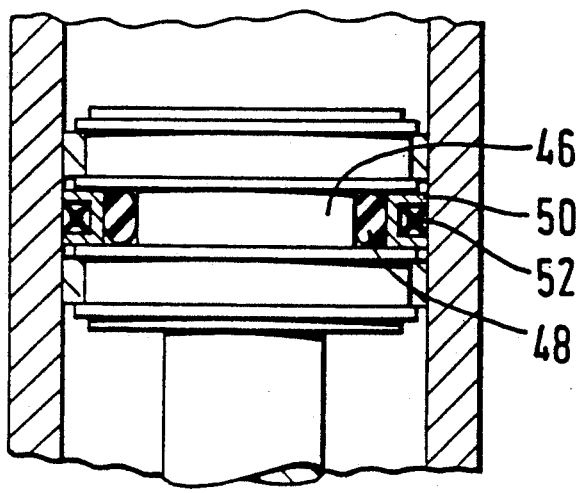
FIG. 3 is a section side elevation on an even larger scale of a piston in said means showing details of sealing means with which said piston is provided.
Figure 4:
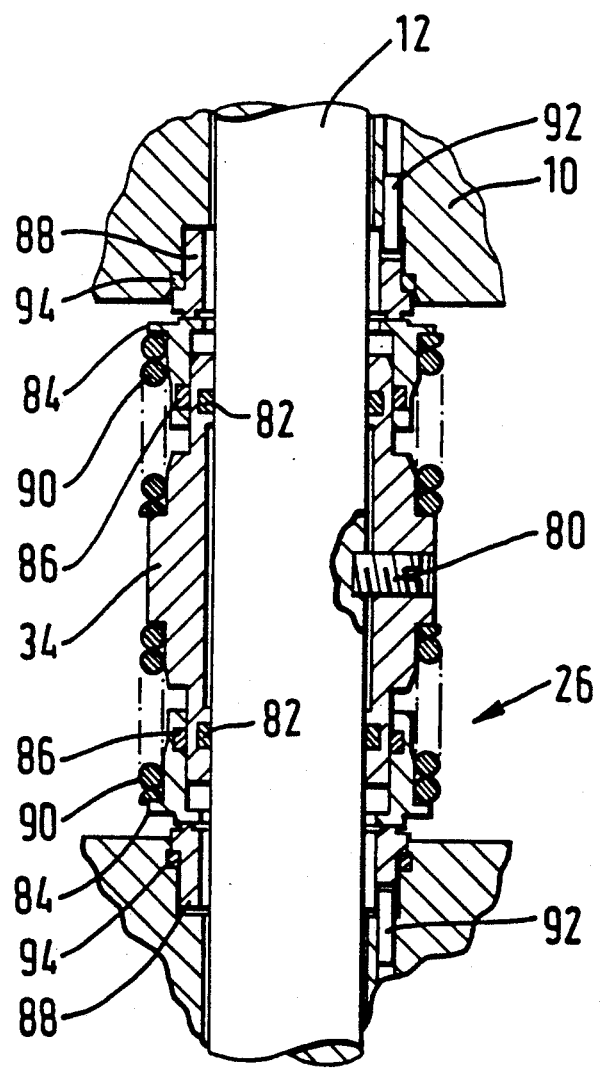
FIG. 4 is a sectional side elevation of the shaft seal on a larger scale than FIG. 1.

To maintain the pressure in the spaces 20, 22 of the fluid being pumped and to prevent its escape, the shaft 12 has a seal assembly indicated generally at 26 which is subjected to a back pressure greater than the pressure of said fluid. This back pressure is applied to oil in a chamber 28 surrounding the seal assembly 26 by novel means shown in FIG. 2. The back pressure chamber 28 has first and second opposed sides 29, 31, with the first side 29 being adjacent the casing 10. The novel means shown in FIG. 2 comprises a piston 30 slidable in a cylinder 32 one end of which communicates with the fluid in said space and the other end of which communicates with said chamber. Referring to FIG. 4, the seal assembly 26 is of known so-called double back-to-back type and comprises a sleeve 34 secured to the shaft 12 by a set-screw 80 and having two annular grooves in its bore each of which contains a resilient sealing ring 82. Two rotary sealing collars 84 are slideably mounted on the respective ends of the sleeve 34, and each of said collars has an annular groove in its bore containing a resilient sealing ring 86. The collars 84 are urged into end face contact with respective stationary sealing collars 88 by means of respective oppositely-handed helical compression springs 90 each of which is confined between a shoulder on the sleeve 34 and a shoulder on the respective collar 84. Each collar 88 is slideably mounted in the casing 10 and held against rotation by a pin 92, and a resilient sealing ring 94 is confined between a shoulder on the collar 88 and a shoulder on the casing 10. Due to being of double back-to-back type, the seal assembly 26 contains the back pressure within the chamber 28 as well as maintaining the pressure in the spaces 20, 22 of the fluid being pumped. The cylinder 32 comprises two co-axial portions 36, 38 of different diameters with a wall 40 between them, through a bore 42 in which a piston rod 44 is slidable with appreciable clearance. The piston 30 is rigidly secured on that end of the rod 44 which is disposed within the larger diameter portion 38 of the cylinder 32, and the periphery of the piston 30 is provided with hydraulic sealing means indicated generally at 45 of known type as shown in FIG. 3 which slide in frictional contact with the cylinder 32. Said hydraulic sealing means are housed in an annular groove 46 in the piston 30 and comprise an inner resilient O-ring 48, an outer ring 50 of channel-shaped cross-section urged towards the bore of the cylinder 32 by the O-ring 48, and an elastomer ring 52 disposed in the channel of the ring 50. The piston rod 44 also has a disc 54 secured by means of a circlip 56 on that one of its ends within the smaller diameter portion 36 of the cylinder 32, and the periphery of the disc 54 is provided with an anti-friction ring 58 which slides in contact with the cylinder 32. A helical compression spring 60 is confined under compression between the disc 54 and the wall 40 and a vent hole 62 is formed through the disc 54. That end of the larger diameter 38 of the cylinder 32 remote from the rod 44 communicates with the fluid being pumped by way of a port 64 and a pipe 66, and that end of the smaller diameter portion 36 of the cylinder 32 remote from the rod 44 communicates with the oil in the chamber 28 by way of a port 68 and a pipe 70. Due to the provision of the vent hole 62 through the disc 54 and the clearance between the rod 44 and the bore 42 in the wall 40, said oil fills all of the cylinder 32 on the rod side of the piston 30. The disc 54 carries annular magnets 72 which control remotely the orientation of each of a series of hinged flaps 73 disposed in a housing 74 secured along the exterior of the smaller diameter portion 36 of the cylinder 32, the sides of the flaps facing towards the larger diameter portion 38 of the cylinder 32 being painted red and those facing in the other direction being the same color as the exterior of the cylinder 32 so as to provide a visual indication of the position of the disc 54 and thus of the piston 30. The magnets 72 also control remotely one switch 76 disposed on the exterior of the smaller diameter portion 36 of the cylinder 32 which automatically initiates replenishing of the oil when necessary, and another switch 78 disposed on the exterior of said portion which automatically terminates replenishing of the oil.

In operation, the pressure of the fluid being pumped acts upon that side of the piston 30 remote from the rod 44 to create a corresponding pressure in the oil on the other side of the piston 30 which communicates with the chamber 28, and the helical compression spring 60 acts in conjunction with said fluid to create a preponderance of, say, between 1 and 2 bar in the back pressure exerted by said oil over the pressure of the fluid being pumped. If oil gradually seeps from the system, this is indicated by the hinged flaps 73 and ultimately replenished by the two switches 76, 78. If all the oil is lost from the system, the hydraulic sealing means 48, 50, 52 on the piston 30 have sufficient strength to prevent any escape to atmosphere of the possibly hazardous fluid being pumped by way of that side of the piston 30 adjacent the rod 44 and the chamber 28 with which said side communicates.

In one modification, the oil is not replenished automatically and the magnets 72 control a single switch disposed on the exterior of the smaller diameter portion 36 of the cylinder 32 which operates a remote warning signal when replenishment is needed. In another modification, the helical compression spring 60 is replaced by a stack of disc springs.

I claim:

1. Apparatus for driving fluid, said apparatus comprising:
   a main casing;
   a rotatable shaft extending through said main casing to drive fluid within said main casing;
   an oil-filled back pressure chamber having first and second opposed sides with said first side being adjacent to said main casing, said rotatable shaft also passing through said back pressure chamber; and
   sealing means for applying a safety seal to said rotatable shaft on said first and said second opposed sides of said back pressure chamber;
   said sealing means comprising:
   a double shaft seal providing a first seal between said rotatable shaft and said main casing and a second seal between said rotatable shaft and said second opposed side of said back pressure chamber; and
   back pressure means for applying a back pressure to said back pressure chamber, said back pressure means comprising a piston slidable in a cylinder one end of which communicates with said main casing and the other end of which communicates with said oil-filled back pressure chamber, said piston being urged towards said other end of said cylinder by spring means as well as by pressure of the fluid being driven;
   each of said first and second seals comprising a first sealing face extending in a plane normal to the rotational axis of said rotatable shaft and a second sealing face also extending in a plane normal to the rotational axis of said rotatable shaft, said first and second sealing faces being resiliently urged into sealing engagement.

2. Apparatus according to claim 1, wherein said spring means comprise a helical compression spring.

3. Apparatus according to claim 1, wherein said piston carries a magnet which enables its position in said cylinder to be sensed remotely.

4. Apparatus according to claim 3, wherein said magnet controls one switch disposed on the exterior of said cylinder which automatically initiates replenishing of the oil when necessary, and another switch disposed on the exterior of the cylinder which automatically terminates replenishing of the oil.

5. Apparatus according to claim 3, wherein said magnet controls a switch disposed on the exterior of said cylinder which operates a remote warning signal when the oil needs replenishing.

6. Apparatus for driving fluid, said apparatus comprising:
   a main casing;
   a rotatable shaft extending through said main casing to drive fluid within said main casing;
   an oil-filled back pressure chamber having first and second opposed sides, with said first side being adjacent to said main casing, said rotatable shaft also passing through said back pressure chamber; and
   sealing means for applying a safety seal to said rotatable shaft on said first and said second opposed sides of said back pressure chamber;
   said sealing means comprising:
   a double shaft seal providing a first seal between said rotatable shaft and said main casing and a second seal between said rotatable shaft and said second opposed side of said back pressure chamber; and
   back pressure means for applying a back pressure to said back pressure chamber, said back pressure means comprising a piston slidable in a cylinder one end of which communicates with said main casing and the other end of which communicates with said oil-filled back pressure chamber, said piston being urged towards said other end of said cylinder by spring means as well as by pressure of said fluid being driven, said piston carrying a magnet which enables a position of said piston in said cylinder to be sensed remotely, said magnet controlling the orientation of each of a series of hinged flaps disposed along the exterior of the cylinder, each of said flaps having sides, the sides facing in one direction having a different color to those facing in the other direction to provide a visual indication of said position of said piston in said cylinder;

each of said first and second seals comprising a first sealing face extending in a plane normal to the rotational axis of said rotatable shaft and a second sealing face also extending in a plane normal to the rotational axis of said rotatable shaft, said first and second sealing faces being resiliently urged into sealing engagement.

7. Apparatus according to claim 6, wherein said magnet controls one switch disposed on the exterior of said cylinder which automatically initiates replenishing of the oil when necessary, and another switch disposed on the exterior of said cylinder which automatically terminates replenishing the oil.

8. Apparatus according to claim 6, wherein said magnet controls a switch disposed on the exterior of said cylinder which operates a remote warning signal when the oil needs replenishing.

* * * * *